Aug. 15, 1961   D. A. BOARD, JR   2,995,813
EXTRUSION METHOD OF MAKING BALL-AND-SOCKET
TYPE BEARING ASSEMBLY
Filed Dec. 12, 1958   2 Sheets-Sheet 1

INVENTOR.
DAVID A. BOARD, JR.
BY Miketta and Glenny
ATTORNEYS.

Aug. 15, 1961  D. A. BOARD, JR  2,995,813
EXTRUSION METHOD OF MAKING BALL-AND-SOCKET
TYPE BEARING ASSEMBLY
Filed Dec. 12, 1958  2 Sheets-Sheet 2
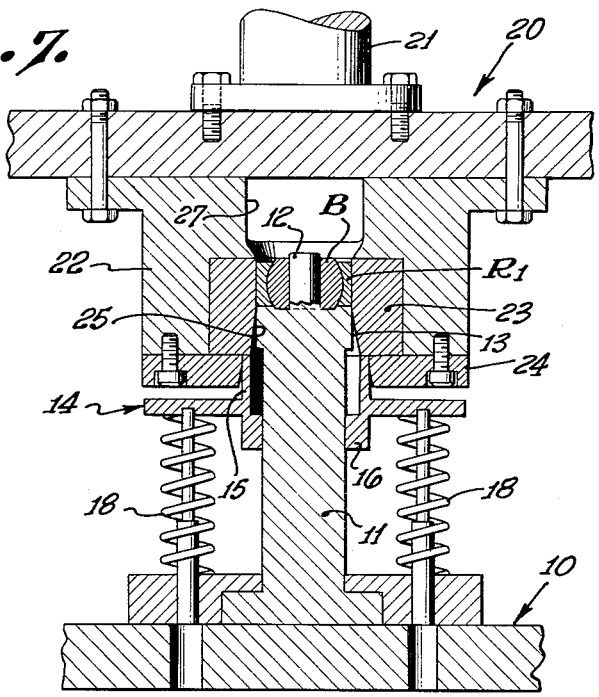
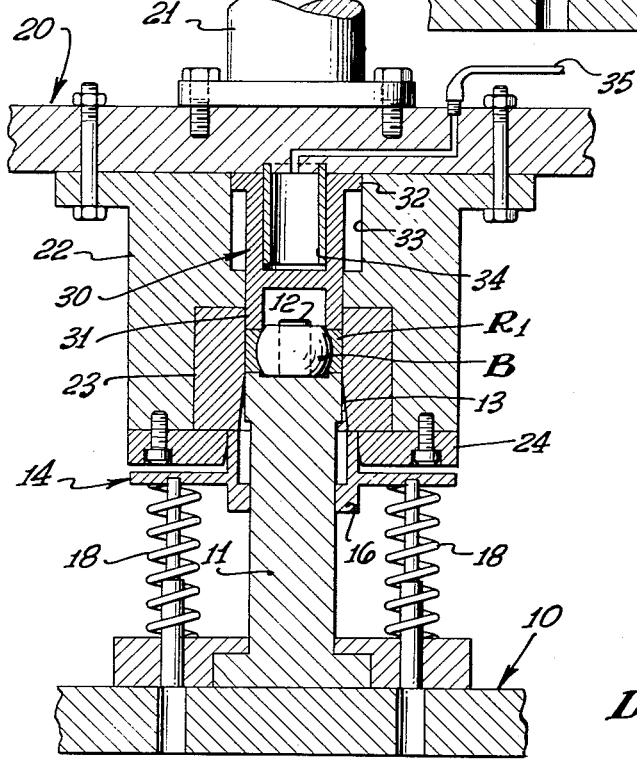
INVENTOR.
DAVID A. BOARD, JR.
BY Miketta and Glenny
ATTORNEYS.

United States Patent Office 2,995,813
Patented Aug. 15, 1961

2,995,813
EXTRUSION METHOD OF MAKING BALL-AND-SOCKET TYPE BEARING ASSEMBLY
David A. Board, Jr., Sylmar, Calif., assignor, by mesne assignments, to Kahr Bearing Corporation, Burbank, Calif., a corporation of California
Filed Dec. 12, 1958, Ser. No. 779,936
4 Claims. (Cl. 29—441)

The invention relates to an economical, facile method of making bearing assemblies of the ball and race type, sometimes known as ball and socket bearing assemblies or self-aligning bearings.

Bearings of this general type have been known for many years and one typical method of manufacturing them is disclosed in Patent 2,462,138. In such prior method the outer element or race ring blank comprised an axial cylindrical bore, the outer surfaces of the race having a peculiar configuration. A ball member was placed within such ring blank and opposing cup-shaped dies bent the end areas of the ring toward the ball. The ball was pretreated with a viscous chilled grease. In all of these preceding methods the metal of the race ring was actually bent around the ball and produced a wrinkled internal surface in bearing contact with the centrally disposed ball. Moreover, when stainless steel, molybdenum steel, or other hard, heat treated metals were employed for the race, minute fractures were often observed in the outer surface areas of such race rings. The metal was non-uniformly stressed in the race ring; the dies themselves were quite expensive and undependable in that the race ring blank would often get caught or misaligned and an unsatisfactory bearing would result or the entire die would get jammed.

In all of these prior processes a considerable amount of machining had to be performed on the ball-race assemblies after the race ring had been formed around the ball; the outer surface of the ring had to be machined to produce a cylindrical surface, the end faces normally had to be machined and various chamfers cut to break the sharp corners.

In many instances the ball-race assemblies had to be loosened in order to permit the ball to rotate within the race ring. Heim in Patent 2,476,728 described hammering of the tight bearings to expand the outer member and thereby loosen the assembly; hammering or rolling of such tight assemblies has been used for many years.

The method of the present invention distinguishes from prior practices in that an extension type of die is employed (instead of a bending die) and the metal of the race ring is not bent but actually extruded around the ball. The presence of wrinkles on the inner surface of the race is thus avoided and a much smoother bearing surface presented to the rotatable ball. Fracture and weakening of the outer race is eliminated; tensile and compressive stresses of different magnitudes are avoided and instead substantially all of the metal of the outer race ring is maintained under compression. Furthermore, the method of the present invention eliminates excessive machining or finishing operations and results in a ball-race assembly wherein the outer diameter of the race is a smooth cylinder of substantially finished diameter. Inasmuch as finish machining is virtually eliminated, metal waste is obviated.

The present invention is, therefore, directed to methods and devices whereby self-aligning bearings of the ball and socket type may be manufactured in a rapid and economical manner. In addition, the bearings manufactured in accordance with the present invention are stronger and present a smooth bearing surface to the spherical surface of the inner ball-shaped member, such smooth inner surface of the race being substantially uniformly clearance-spaced from the ball. In other words, radial and axial clearances of virtually equal magnitude can be attained whereas prior methods which involve loosening, as in Patent 2,626,841, resulted in much larger clearance axially of the ball and race than radially.

Generally stated, the method of the present invention comprises preforming an annular metallic race ring blank of greater outer diameter and a narrower width than that desired in the finished bearing assembly. Such race ring blank is provided with an axial opening adapted to permit an inner ball-shaped member to pass therethrough or be inserted therein and an inner concave surface facing such ball. This preformed race ring blank is positioned around a hard ball-shaped member having a finished spherical surface (and generally provided with an axial bore) and such arrangement then forced axially into an extrusion die so as to compress the race ring blank around the ball member and place the inner concave surface of the race ring blank onto bearing contact with the spherical surface of the ball. The extrusion die preferably includes a somewhat conical entrance and a mouth orifice into which the race ring and ball are pressed, the diameter of the circular orifice establishing the finished outer diameter of the race and its rotatably retained ball. During the compression of the race ring blank around the ball, the outer diameter of the race is reduced and its width increased. Almost any metal or alloy having some ductility or malleability may be utilized for the race, including brasses, bronzes, aluminum bronzes, stainless steel, heat-treated steels, molybdenum steels such as SAE 4130, etc. Heat treated steels suitable for use in ball bearings, such as martensitic stainless steels AISI types 410 and 420 exhibit Rockwell hardness numbers between about C12 to C40 and between about C30 to C55 respectively. (See Metals Handbook, 1948 edition, The American Society for Metals, page 554, Table II and page 555, Table V.) Cold drawn aluminum bronze tubing may exhibit a Rockwell hardness number of about B85 (see Metals Handbook, supra page 929, Table I) while hardened commercial bronze may exhibit a Rockwell hardness number of about B75. (Metals Handbook, supra page 912, Table I.)

The finished ball-race assembly discharged from the extrusion die requires substantially no machining and will be found to have a virtually uniform bearing clearance on the order of 0.001 to 0.002 inch between the ball and the internal surface of the race when the dimensions of the die and the dimensions of the race ring have been properly computed in the light of the physical characteristics of the metal being employed and by the use of engineering knowledge applied in accordance with the disclosures made herein.

It is an object of the present invention, therefore, to disclose and provide a novel, rapid and economical method of making ball-and-race type of bearing assemblies.

A further object of the invention is to disclose and provide a method of making self-aligning bearings wherein the inner surface of the race is not subject to bending and wrinkling and does not exhibit minute fractures which tend to weaken the structure of the race.

Another object is to disclose and provide a novel method of making self-aligning bearing assemblies without waste of metal and without excessive finish machining and loosening operations.

A still further object of the invention is to disclose and provide a simple and effective arrangement of elements by means of which the method of the present invention may be economically performed.

These and other objects, advantages and resultants of the invention will become apparent from the following description.

For purposes of illustration, reference will be had to the appended drawings in which—

FIG. 7 is a view similar to that in FIG. 6 illustrating the arrangement of the parts when the ring and ball assembly is within the orifice or throat of the extrusion die.

FIG. 8 is a vertical section partly in elevation of a modified form of extrusion die with the assembly within the orifice of the die.

Figure 1:
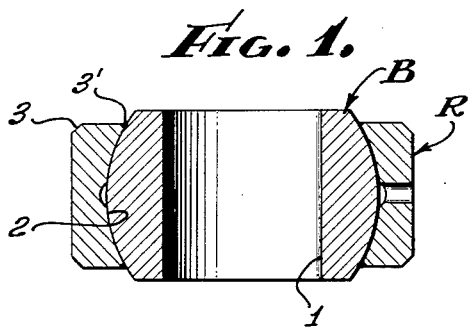
FIG. 1 is a side elevation partly in section of a self-aligning bearing assembly made in accordance with the method herein disclosed.

A typical self-aligning bearing is illustrated in FIG. 1 and comprises the inner ball-shaped member B generally made of hard metal and provided with a finished, polished spherical surface. Ordinarily the ball is in the form of a spherical zone and is provided with an axial bore 1, although in some instances the ball is provided with a neck or necks and the bore 1 may be splined, lined, carry a bushing, etc.

The encircling outer race ring R is ordinarily made of any suitable metal, steel, or alloy and includes an inner concave surface 2 in bearing contact with the surface of the ball. Chamfers, such as 3 and 3′, are provided at the circular inner and outer edges of the race ring.

Bearing contact between the inner concave surface of the race R and the outer spherical surface of the ball B may be here defined as the contact between said surfaces which normally permits a film of lubricant to exist between such surfaces; such bearing contact requires a clearance between such surfaces which may vary from 0.0005 to about 0.002 inch, here referred to as bearing clearance or spacing between bearing surfaces. Bearing contact is so-called preloaded bearings may be smaller than 0.0005 inch and include physical contact between the opposing surfaces, necessitating the application of a turning force or torque (generally measured in inch pounds) to permit relative movement between the ball and its race. Such preloaded bearings are sometimes required by specific applications in industry, aircraft, instrumentation, etc. It is to be noted that for some uses it is desirable that the bearing clearances be kept very small (on the order of 0.0005 inch) whereas for most uses, even in aircraft work, a bearing clearance of 0.002 inch and sometimes 0.003 inch is deemed satisfactory.

Figure 2:
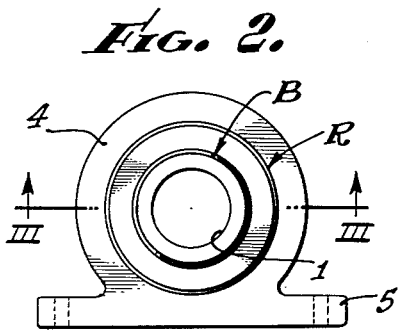
FIG. 2 is an end view of a bearing assembly such as is illustrated in FIG. 1, mounted in a bracket.
Figure 3:
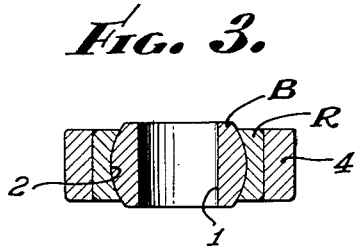
FIG. 3 is an axial section taken along plane III—III in FIG. 2.
Figure 4:
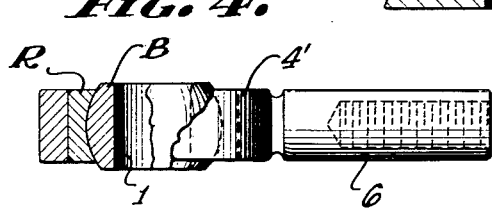
FIG. 4 is an axial section taken through a rod end type of bearing embodying a ball-race assembly.

A self-aligning bearing of the character shown in FIG. 1 is generally employed in a housing. FIGS. 2 and 3 illustrate the ball-race assembly, press fitted or otherwise suitably retained in a bracket or hanger having the outer annular portion 4 and a base with wings 5 by means of which the bearing may be connected to a suitable support, machine, framework, or the like. In FIG. 4 the outer annular housing 4′ is shown provided with an integral shank 6 (which may be internally or externally threaded). Devices of this sort are generally referred to as rod end bearings.

Bearings of the types hereinabove referred to are manufactured in accordance with the present invention by the use of a preformed race blank having the characteristics illustrated in FIG. 5. This race blank $R_1$ has an outer diameter $D_1$ greater than that of the finished ball-race assembly to be made; it has a width $W_1$ which is less than the width of the finished assembly. The intersection of the parallel transverse end faces of the race blank with the cylindrical outer surface of the blank is chamfered as indicated at 3. The internal surface of the race blank is provided with a preformed, milled and ground concave surface 2′. Additional chamfers, such as 3′, are formed at the outer edges of the concave surface 2′. A shallow oil groove 7 may be formed in the concave surface 2′ and if desired radially extending oil holes 8 may be formed in the race ring, in communication with the oil groove 7. A ball B of the required diameter having a smooth spherical surface and provided with an inner bore of the desired size and configuration is used. It is to be noted that the race ring blank is provided with an aperture or axial opening adapted to receive the ball B so that the race ring $R_1$ may be readily placed around the ball B.

Figure 5:
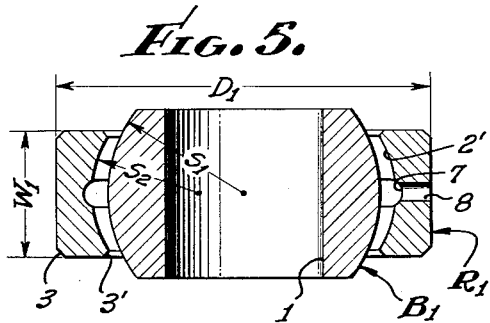
FIG. 5 is an enlarged axial section taken through a race ring blank and an inner ball-shaped member prior to the compression of the blank around the ball in accordance with the method of this invention.

In many instances it is desirable that the radius of curvature $S_1$ of the inner surface of the race blank $R_1$ be somewhat smaller than the radius of curvature $S_2$ of the spherical surface of the ball B, as indicated in FIG. 5. More correctly, therefore, the inner surface 2′ of the race blank $R_1$ may be said to be the surface of a torus.

The compression of the race blank around the ball may take place in various types of devices. The arrangement illustrated in FIGS. 6 and 7 has been found to be eminently suited and comprises a work table 10 supporting the post 11 which may be provided with an upstanding pin 12 arranged to slideably receive the inner ball member B. The upper portion of the post 11 is provided with a head having the cylindrical portion 13 substantially equal in diameter to the finished diameter of the race and upon which the ring blank $R_1$ is positioned. Slideably mounted on the post 11 is a locating ring 14 having an upstanding flange or fingers 15 cooperating with the outer surface of the ring blank, and a lower flange 16 which provides a stop against a downwardly facing shoulder on the post 11. The ring 14 is upwardly biased as by a spring or springs 18.

Above the work table 10 is the crosshead 20 of a ram; the crosshead 20 is mounted on suitable vertical guides or standards (not shown) whereby the ram or hydraulic cylinder 21 may move the crosshead toward and away from the work table 10. Suitably connected to the lower surface of the crosshead 20 is the die block 22 containing the extrusion die 23. The die 23 may be removably held in a cavity of the die block 22 as by means of a retaining ring 24. Various dies, for bearings of different sizes and outer diameters, may be positioned within the die block 22.

The die 23 is provided with a mouth or entrance portion 25 which is preferably conical, the walls of this portion being preferably inclined at an angle of between 5° and 15° to the axis of the die. The walls of this mouth merge with the orifice portion 26, this orifice being preferably circular in cross section and having a diameter equal to the external diameter of the race of the finished bearing. The length of this orifice portion 26 is preferably equal to or slightly greater than the width of the race of a finished bearing. In the form illustrated, the orifice 26 discharges into an enlarged chamber provided with diametrically opposed ports 27 formed in the die block 22, through which a finished bearing may be removed by suitable fork-shaped or other means.

Figure 6:
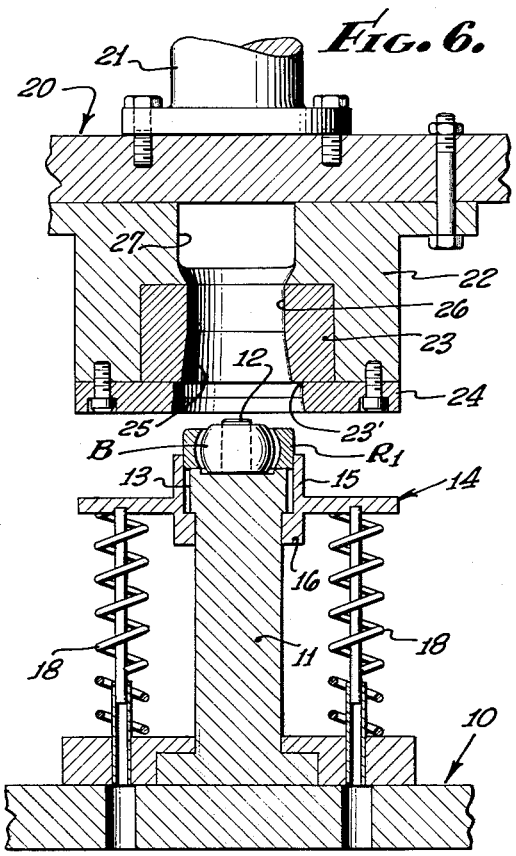
FIG. 6 is a vertical section (partly in elevation) of an extrusion die press in which the method may be performed, the view illustrating the arrangement of parts prior to the entrance of the parts into the extrusion die.

Those skilled in the art will readily appreciate the operation of the arrangement illustrated in FIGS. 6 and 7. The ball B is slipped upon the pin 12 of the supporting post 11 and the ring blank $R_1$ is positioned around the ball, being supported by the head 13 of the post and centered around the ball by the flange 15 of locating ring 14. The ram is actuated to move the extrusion die downwardly; the ring blank $R_1$ enters the mouth 25 of the extrusion die; the upper edge of the locating ring flange 15 enters the locking ring 24 and is stopped by the lower edge 23' of the die 23. As the crosshead 20 and extrusion die 23 move downwardly, the locating ring is caused to move downwardly along the supporting post 11 while the ring blank $R_1$ is compressed toward the ball B. The ball and its ring blank then enter the orifice 26 and all of the metal of the ring blank is compressed against the ball, such compression reducing the external diameter of the ring blank and causing the widht ($W_1$) of the ring blank to be increased. Continued downward movement of the ram and die eventually forces the ball and ring into the enlarged chamber on the other side of the orifice; the movement of the ram is stopped, the completed bearing is grasped by a suitable tool, the ram and die are moved upwardly so as to withdraw the pin 12 from the ball and the completed ball-race assembly is withdrawn from the die block 22 through the port 27.

Inasmuch as the inner surface 2' of the ring blank $R_1$ was preformed and ground to a concave contour, the extrusion hereinabove described does not involve any appreciable bending of the metal of the race ring and, therefore, no wrinkles or other irregularities are formed in the surface 2'. This inner concave surface 2' is brought into bearing contact with the spherical surface of the ball. Substantially all of the metal of the ring blank $R_1$ is subjected to high compression during the extrusion and the absence of tensions or stresses in such ring blank minimizes and renders negligible any springback of the metal of the ring from the spherical surface of the ball. In practice it has been found that substantially the entire inner surface of the race ring is uniformly clearance-spaced from the outer spherical surface of the ball.

The size of the ball, the diameter of the bore in the ball, the presence or absence of splines in the ball bore, the presence or absence of oil grooves on the inner surface of the race, the width and thickness of the race ring, the type of metal or alloy used for the race, the finished outer diameter or contour of the race, etc., are variables which may be changed in accordance with the requirements of the installation in which the finished bearing is to be used, such as angular mis-alignment expected, the load and direction of load to be carried, rotational speed, temperature or range of temperatures to be encountered in use, type of housing employed, etc. Similarly, the precise dimensions of the race blank and of the extrusion die orifice 26, the pressures employed during extrusion, the rapidity with which the extrusion takes place, the time of dwell (if any) of the assembly within the orifice, etc., are influenced by size, thickness and physical properties of the metals and alloys used or required for the race. The radius imparted to the inner surface of the race ring blank during preforming is also influenced by the width and thickness of the race, the diameter of the ball, etc. These various factors and variables must be considered by the manufacturer and are imposed upon him by the requirements of the ultimate user of the bearings.

Bearings manufactured in accordance with the method herein described are of better quality than those manufactured by other methods, the improvement being most pronounced in the uniformity of the clearance between the inner member or ball and the race, in the improved smoothness of the inner surface of the race which is in bearing contact with the ball, and in the freedom from fractures or inherent weaknesses of the race. In addition, it has been found that the hardness of the race is appreciably increased by the extrusion of the race ring blank; for example, when 4130 steel is used for the race ring blank, with an initial hardness of 30, the extruded race will in most instances be found to have a hardness of 34–36 Rockwell C. From the standpoint of manufacturing economy, the method has great advantages in that the finished bearing assembly need not be loosened by hammering, rolling or other treatment, the external diameter of the race often needs no machining whatsoever (since the diameter is predetermined by the orifice of the die) and chamfers need not be cut since they have been preformed and remain in the finished assembly.

As previously indicated, other types of extrusion dies may be employed. FIG. 8 illustrates a modified arrangement wherein the upper die block 22 includes a knockout cylinder 30 having a lower skirted portion 31 adapted to rest against the race ring when it is within the throat or orifice of the extrusion die 23. The upper end of the knockout piston 30 is flanged as indicated at 32 for movement within a cylindrical cavity 33 formed in the die block. The crosshead 20 of the ram may carry a tubular cylinder 34 slidably fitting the inner walls of the knockout cylinder 30. Pressure fluid may be supplied to the interior of the knockout cylinder from a suitable, controlled source by a flexible hose 35. The means for positioning the ball and race ring blank may be identical to those described heretofore. From an examination of FIG. 8 it will be evident, however, that the modified arrangement illustrated permits some pressure to be exerted on the upper end face of the race ring blank during forming and after the assembly has been formed and the ram crosshead and die has been lifted, the assembled bearing may be pushed out of the orifice of the extrusion die 23 by supplying pressure fluid to the knockout cylinder 30, which then forces the assembled bearing out of the throat or orifice of the die.

Those skilled in the art will also readily appreciate that the extrusion die may be stationary and the ball-and-race ring blank then axially passed through the extrusion die. It may be noted, however, that in some instances it is desirable to position the race ring blank $R_1$ with its transverse mid-plane slightly above the center of the ball B, it having been noticed that elongation of the race ring width appears to take place in the direction away from the apex of the conical mouth of the extrusion die. It may be mentioned that the maximum internal diameter of the concave inner surface of the race blank may be 3% to 10% or even 15% greater than the diameter of the ball to be used therein, even when the race is of hard steel, and 20% greater when softer materials such as bronzes are employed. The width of the race ring blank may be readily ascertained by multiplying the desired finished width by the finished outer diameter (before grinding of the outer surface) and dividing by the outer diameter of the blank.

Although in most instances the race ring blank is a single homogeneous metal or alloy, there are applications which are benefited by the use of plating of one or all surfaces of the race ring blank, or by the use of a laminated race ring blank, wherein one metal is exposed on the inner, concave surface and another on the outer cylindrical surface. These and other modifications and additions to the method here described are not excluded. All changes and modifications coming within the scope of the appended claims are embraced thereby.

I claim:

1. An extrusion method for making a ball and socket type of bearing assembly including an inner, ball-shaped member and an outer race having an inner bearing surface substantially uniformly clearance-spaced from such inner member, said outer race having a cylindrical outer surface, comprising: preforming a metallic, annular race ring blank of a hardened metal of a greater outer diameter and a narrower width than desired in the final bearing assembly, said race ring blank having an axial opening adapted to permit an inner ball-shaped member to pass therethrough, to form an inner concave surface having a radius of curvature smaller than the radius of curvature of an outer surface of the ball-shaped member and being concave on both side of a mid-plane transverse to the axis of the race ring blank; placing a ball-shaped member having a finished spherical surface axially within said preformed race ring blank; and moving said race ring blank and ball-shaped member in the direction of the axis of said blank into a compression zone provided with means for applying compression to said race ring blank, said means being stationary transverse to and in the direction of movement of said race ring blank and said ball-shaped member, and subjecting said blank to compression inwardly as it moves through said zone to place the inner concave surface of said blank into bearing contact with said ball-shaped member.

2. An extrusion method for making a ball and socket type of bearing assembly including an inner, ball-shaped member and an outer race having an inner bearing surface substantially uniformly clearance spaced from such inner member, said outer race having a cylindrical outer surface, comprising: preforming a metallic annular race ring blank of hardened steel of a greater outer diameter and a narrower width than desired in the final bearing assembly, said race ring blank having an axial opening adapted to permit an inner ball-shaped member to pass therethrough, to form an inner concave surface having a radius of curvature smaller than the radius of curvature of an outer surface of the ball-shaped member and being concave on both sides of a mid-plane transverse to the axis of the race ring blank; placing a ball-shaped member having a finished spherical surface axially within said preformed race ring blank, said race ring blank having a width smaller than the diameter of the ball-shaped member and surrounding a generally equatorial zone of said ball-shaped member; and moving the race ring blank and ball-shaped member axially into a virtually cylindrical extrusion die having a portion of smaller diameter than the outer diameter of said race ring to compress the metal of said race ring blank against said ball-shaped member and place substantially the entire inner concave surface of the race ring blank into bearing contact with the spherical surface of the ball-shaped member in said race ring.

3. In the method as stated in claim 2 wherein the maximum inner diameter of the inner concave surface of the race ring blank is not less than 3% nor more than 20% larger than the outside diameter of the ball-shaped member prior to compression of the race ring blank about the ball-shaped member.

4. An extrusion method for making a ball and socket type of bearing assembly including an inner, ball-shaped member and an outer race having an inner bearing surface substantially uniformly clearance-spaced from such inner member, said outer race having a cylindrical outer surface, comprising: preforming a metallic annular race ring blank of a hardened steel having a greater outer diameter and a narrower width than desired in the final bearing assembly, said race ring blank having an axial opening adapted to permit an inner ball-shaped member to pass therethrough, to form an inner concave surface having a radius of curvature smaller than the radius of curvature of an outer surface of the ball-shaped member and being concave on both sides of a mid-plane transverse to the axis of the race ring blank; placing a ball-shaped member having a finish spherical surface axially within said preformed race ring blank; and moving said race ring blank and ball shaped member in the direction of the axis of said blank into a compression zone including compression applying means stationary transverse to and in the direction of movement of said race ring blank and said ball-shaped member through said zone to place the inner concaved surface of the blank into bearing contact with the ball-shaped member.

References Cited in the file of this patent

UNITED STATES PATENTS

| | | |
|---|---|---|
| 1,693,748 | Fiegel et al. | Dec. 4, 1928 |
| 1,793,874 | Skillman | Feb. 24, 1931 |
| 2,361,046 | Molly | Oct. 24, 1944 |
| 2,462,138 | Spangenberg | Feb. 22, 1949 |
| 2,626,841 | Potter | Jan. 27, 1953 |
| 2,724,172 | Potter | Nov. 22, 1955 |
| 2,728,975 | Potter | Jan. 3, 1956 |